(12) United States Patent
Tolkoff et al.

(10) Patent No.: US 6,634,825 B2
(45) Date of Patent: Oct. 21, 2003

(54) APPARATUS FOR JOINING CYLINDRICAL SECTIONS

(75) Inventors: Samuel William Tolkoff, Boston, MA (US); Leo Gurfinkel, Newton, MA (US); Knut Streitlien, Jamaica Plain, MA (US)

(73) Assignee: Bluefin Robotics Corporation, Cambridge, MA (US)

( * ) Notice: Subject to any disclaimer, the term of this patent is extended or adjusted under 35 U.S.C. 154(b) by 139 days.

(21) Appl. No.: 09/870,645

(22) Filed: Jun. 1, 2001

(65) Prior Publication Data

US 2002/0033126 A1 Mar. 21, 2002

Related U.S. Application Data

(60) Provisional application No. 60/233,275, filed on Sep. 18, 2000.

(51) Int. Cl.[7] .......................... F16L 23/08; F16L 23/10; F42B 19/00
(52) U.S. Cl. .................... 403/286; 403/235; 403/236; 114/22; 114/20.1; 24/279; 24/280; 220/219; 220/220; 285/265; 285/366; 285/367
(58) Field of Search ................................. 403/286, 262, 403/335, 336; 220/319, 320; 285/367, 366, 365, 364; 114/20.1, 22; 24/279, 280; 292/256.6, 256.7, 256.63, 256.65

(56) References Cited

U.S. PATENT DOCUMENTS

| 222,718 A | 12/1879 | McLean |
| 889,493 A | 6/1908 | Urbanski |
| 2,353,572 A | 7/1944 | Kuster et al. |
| 2,572,116 A | 10/1951 | Daly |
| 2,580,396 A | 1/1952 | Bluth |
| 2,616,587 A | 11/1952 | Petch |
| 2,650,115 A | 8/1953 | Taylor |
| 2,659,954 A * | 11/1953 | Woolsey ........................ 24/279 |
| 2,779,282 A | 1/1957 | Raffel |
| 2,790,409 A | 4/1957 | Cain |
| 2,853,038 A | 9/1958 | Hess et al. |
| 2,877,732 A | 3/1959 | Eaton |

(List continued on next page.)

FOREIGN PATENT DOCUMENTS

| DE | 2 001 551 | 7/1971 | |
| DE | 19711579 A1 * | 9/1998 | .......... F16L/23/08 |
| GB | 2 223 716 | 4/1990 | |
| JP | 5-131979 | 5/1993 | |

*Primary Examiner*—Gregory J. Binda
*Assistant Examiner*—Ernesto Garcia
(74) *Attorney, Agent, or Firm*—Oblon, Spivak, McClelland, Maier & Neustadt, P.C.

(57) ABSTRACT

An apparatus for joining cylindrical sections, including a semi-cylindrical profile section or member adapted to be coupled to a cylindrical section on an outer circumferential portion of the profile section or member and including an outer circumferential groove and an inner circumferential ridge; a ring-shaped compression ring or member coupled to the profile section or member and including a circumferential groove on an outer portion thereof and attachment fixtures or members on opposite sides thereof; and a pair of semi-cylindrical tension bands or members forming a ring shape and each including a pair of inner circumferential ridges and attachment fixtures or members on end portions thereof. The circumferential ridge of the profile section or member couples to the circumferential groove of the compression ring or member. One of the circumferential ridges of one of the tension bands or members couples to respective of the circumferential groove of the profile section or member. The attachment fixtures or members of the tension bands or members couple to respective ones of the attachment fixtures or members of the compression ring or member.

12 Claims, 14 Drawing Sheets

U.S. PATENT DOCUMENTS

| | | |
|---|---|---|
| 2,890,670 A | 6/1959 | Francois |
| 2,899,923 A | 8/1959 | Daly et al. |
| 2,992,794 A | 7/1961 | Boyd |
| 3,139,056 A | 6/1964 | Boswell et al. |
| 3,285,628 A | 11/1966 | De Vries |
| 3,327,669 A | 6/1967 | Olson |
| 3,450,082 A | 6/1969 | Demarest, Jr. |
| 3,713,412 A | 1/1973 | Ianuzzi |
| 3,929,533 A | 12/1975 | Horm |
| 4,004,309 A | 1/1977 | Gongwer |
| 4,248,460 A * | 2/1981 | Murray et al. ............. 285/367 |
| 4,522,434 A * | 6/1985 | Webb ..................... 285/368 |
| 5,235,930 A | 8/1993 | Pendleton |
| 5,711,244 A | 1/1998 | Knapp |
| 5,712,447 A | 1/1998 | Hanson |
| 5,995,882 A | 11/1999 | Patterson et al. |
| 6,403,873 B1 * | 6/2002 | Amaral et al. ............. 114/22 |

* cited by examiner

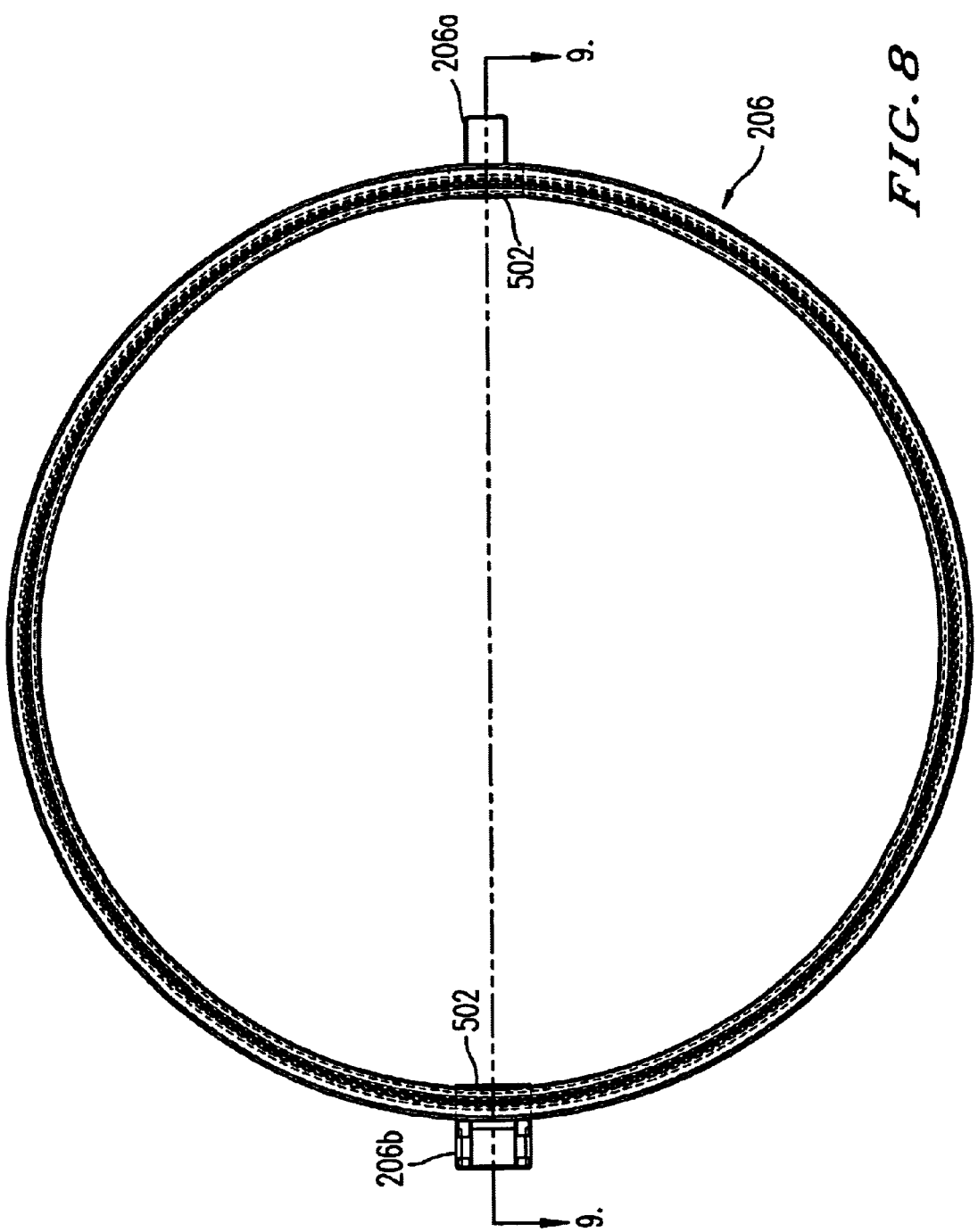

APPARATUS FOR JOINING CYLINDRICAL SECTIONS

CROSS-REFERENCE TO RELATED APPLICATIONS

This application claims priority under 35 U.S.C. §119(e) to United States provisional patent application serial No. 60/233,275, entitled "JOINING RING ASSEMBLY FOR MODULAR VEHICLE," filed on Sep. 18, 2000, the entire contents of which is incorporated by reference herein.

STATEMENT REGARDING FEDERALLY SPONSORED RESEARCH

The present invention was made in part with U.S. Government support under United States Office of Naval Research & Coastal Systems Station contract number N61331-99-C-0046 awarded on Aug. 26, 1999. The U.S. Government has certain rights in the invention.

BACKGROUND OF THE INVENTION

1. Field of the Invention

The present invention relates to an apparatus for joining cylindrical sections and more specifically to an apparatus for joining cylindrical sections of, for example, an autonomous underwater vehicle (AUV).

2. Discussion of Background

In recent years, autonomous underwater vehicles (AUVs), such as small robotic submarines, etc., have been developed. Such autonomous underwater vehicles (AUVs), however, are not robust nor easily serviceable. In addition, such autonomous underwater vehicles (AUVs) are complex robots by their nature and periodic maintenance thereof is difficult. Further, such autonomous underwater vehicles (AUVs) do not provide easy access to the inside of the autonomous underwater vehicles (AUVs). Moreover, such autonomous underwater vehicles (AUVs) are produced in relatively small numbers and different customers may want different payloads integrated into the autonomous underwater vehicles (AUVs). However, such autonomous underwater vehicles (AUVs) typically are not of a modular design allowing different sections to be combined quickly, such as in the case of the swapping of a sensor section, the swapping of a battery section, etc. Finally, such autonomous underwater vehicles (AUVs) typically are not able to be split into different sections to facilitate shipping thereof.

Accordingly, present devices for joining cylindrical sections, such as those that could be used in autonomous underwater vehicles (AUVs), do not provide a robust system addressing the above-noted problems.

SUMMARY OF THE INVENTION

Accordingly, the present invention recognizes that currently no apparatus is available to allow the joining of cylindrical sections together, while performing various functions, such as indexing the different sections to each other, providing a means to separate the sections in both lateral and longitudinal directions, making a connection that is flush with the outside surface of the corresponding cylinder, providing a strong mechanical connection, etc. Accordingly, one object of the present invention is to provide a solution to the above-noted and other problems and deficiencies associated with the joining of cylindrical sections together.

The above described and other objects are addressed by the present invention which provides a novel apparatus for joining cylindrical sections, including a semi-cylindrical profile member adapted to be coupled to a cylindrical section on an outer circumferential portion of the profile member and including an outer circumferential groove and an inner circumferential ridge; a ring-shaped compression member coupled to the profile member and including a circumferential groove on an outer portion thereof and attachment members on opposite sides thereof; and a pair of semi-cylindrical tension members forming a ring shape and each including a pair of inner circumferential ridges and attachment members on end portions thereof. The circumferential ridge of the profile member couples to the circumferential groove of the compression member. One of the circumferential ridges of one of the tension members couples to respective of the circumferential groove of the profile member. The attachment members of the tension members couple to respective of the attachment members of the compression member.

Consistent with the title of this section, the above summary is not intended to be an exhaustive discussion of all the features or embodiments of the present invention. A more complete, although not necessarily exhaustive, description of the features and embodiments of the invention is found in the section entitled "DETAILED DESCRIPTION OF THE PREFERRED EMBODIMENTS."

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein:

FIG. 8 is a detailed view illustrating attachment fixtures or members of the compression ring or member of FIG. 4, according to the present invention;

DETAILED DESCRIPTION OF THE PREFERRED EMBODIMENTS

Figure 1A:
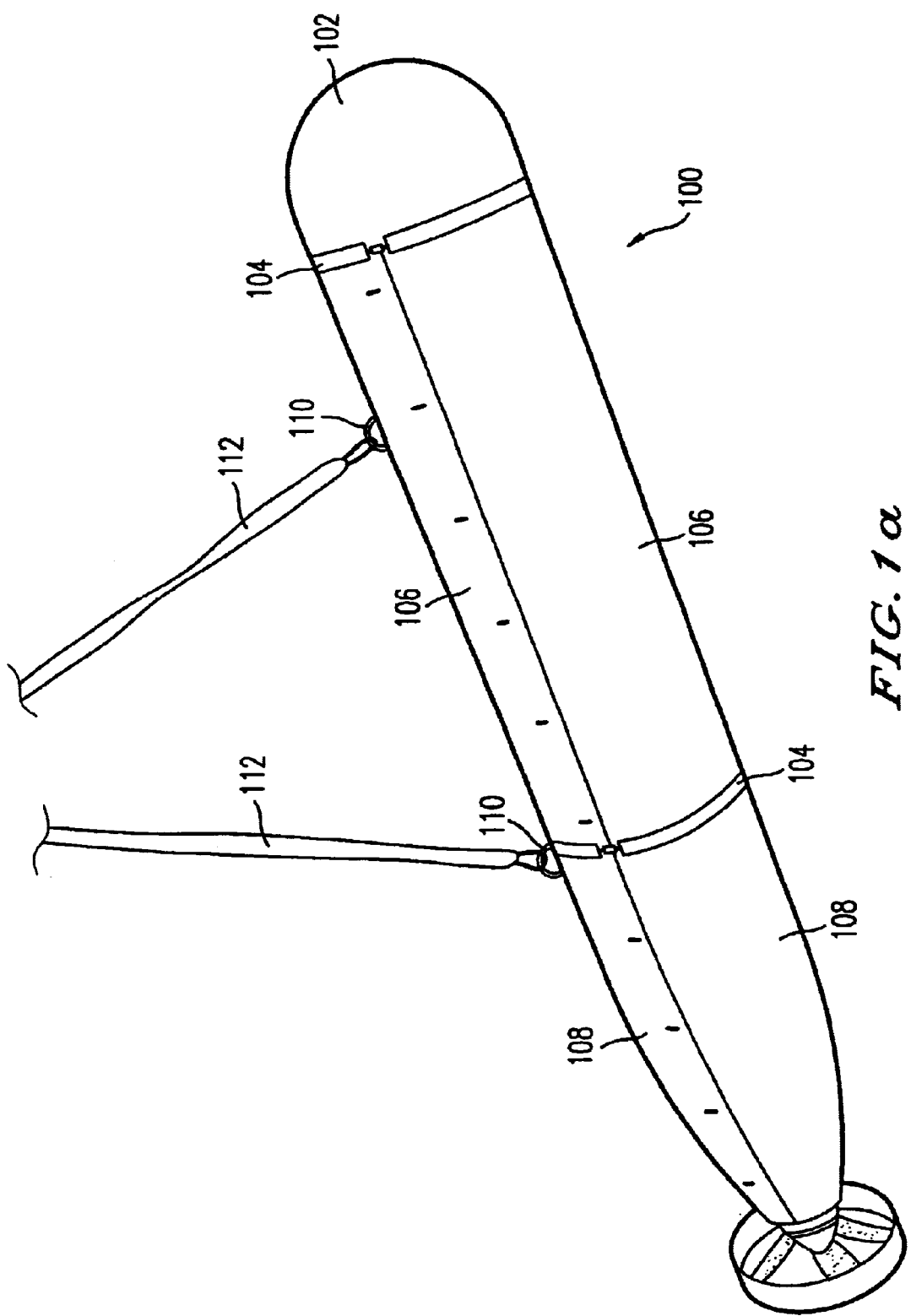
FIG. 1a is a perspective view illustrating an autonomous underwater vehicle (AUV), including joining rings assemblies according to the present invention.

Referring now to the drawings, wherein like reference numerals designate identical or corresponding parts throughout the several views, and more particularly to FIG. 1a thereof, there is illustrated a perspective view of an autonomous underwater vehicle (AUV) 100, including joining ring assemblies 104 according to the present invention. In FIG. 1a, the autonomous underwater vehicle (AUV) 100 includes a nose section 102 having an end which is hemispherical in shape, one or more joining ring assemblies 104, a plurality of mid-body sections 106 which are semi-cylindrical in shape, and a plurality of tail cone sections 108 which are semi-cylindrical in shape and which taper at one end. A first joining ring assembly 104 joins the nose section 102 to the mid-body sections 106 and a second joining ring assembly joins the mid-body sections 106 to the tail cone sections 108. The autonomous underwater vehicle (AUV) 100 may include load bearing rings 110 for raising and lowing the autonomous underwater vehicle (AUV) 100 into the water via straps 112. Together the nose section 102, the mid-body sections 106, and the tail cone sections 108 constitute a fairing and may each typically be constructed from a lightweight, strong and robust engineering plastic (e.g., ABS plastic, etc.), although other materials such as metallic materials may be utilized.

As will be further described, the autonomous underwater vehicle (AUV) 100 of FIG. 1a, according to the present invention, provides a swappable nose section 102, swappable mid-body sections 106, and swappable tail cone sections 108, easy access, and the ability to break the assembly down into smaller components for shipping, without compromising the mechanical integrity of the autonomous underwater vehicle (AUV) 100, and while preserving a smooth vehicle exterior in order to minimize hydrodynamic drag. The tail cone sections 108 and the mid-body sections 106 may constitute top and bottom semi-cylindrical portions of the autonomous underwater vehicle (AUV) 100 as shown in FIG. 1a.

Figure 1B:
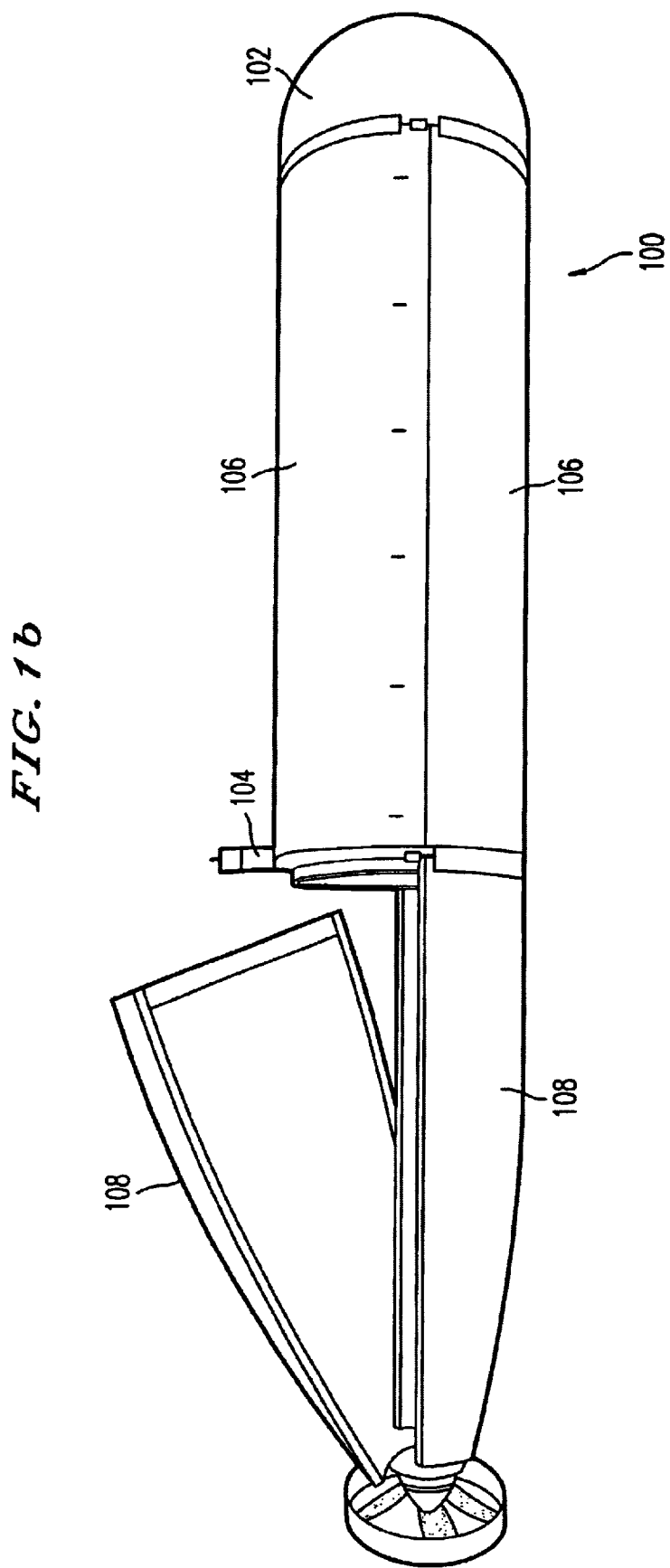
FIG. 1b is a perspective view illustrating the autonomous underwater vehicle (AUV) of FIG. 1a with a tail cone section removed, via disassembly of a joining ring assembly according to the present invention.

FIG. 1b is a perspective view illustrating the autonomous underwater vehicle (AUV) 100 of FIG. 1a with a tail cone section 108 of the autonomous underwater vehicle (AUV) 100 removed, via disassembly of the joining ring assembly 104, according to the present invention, as will now be described with reference to FIG. 2.

Figure 2:
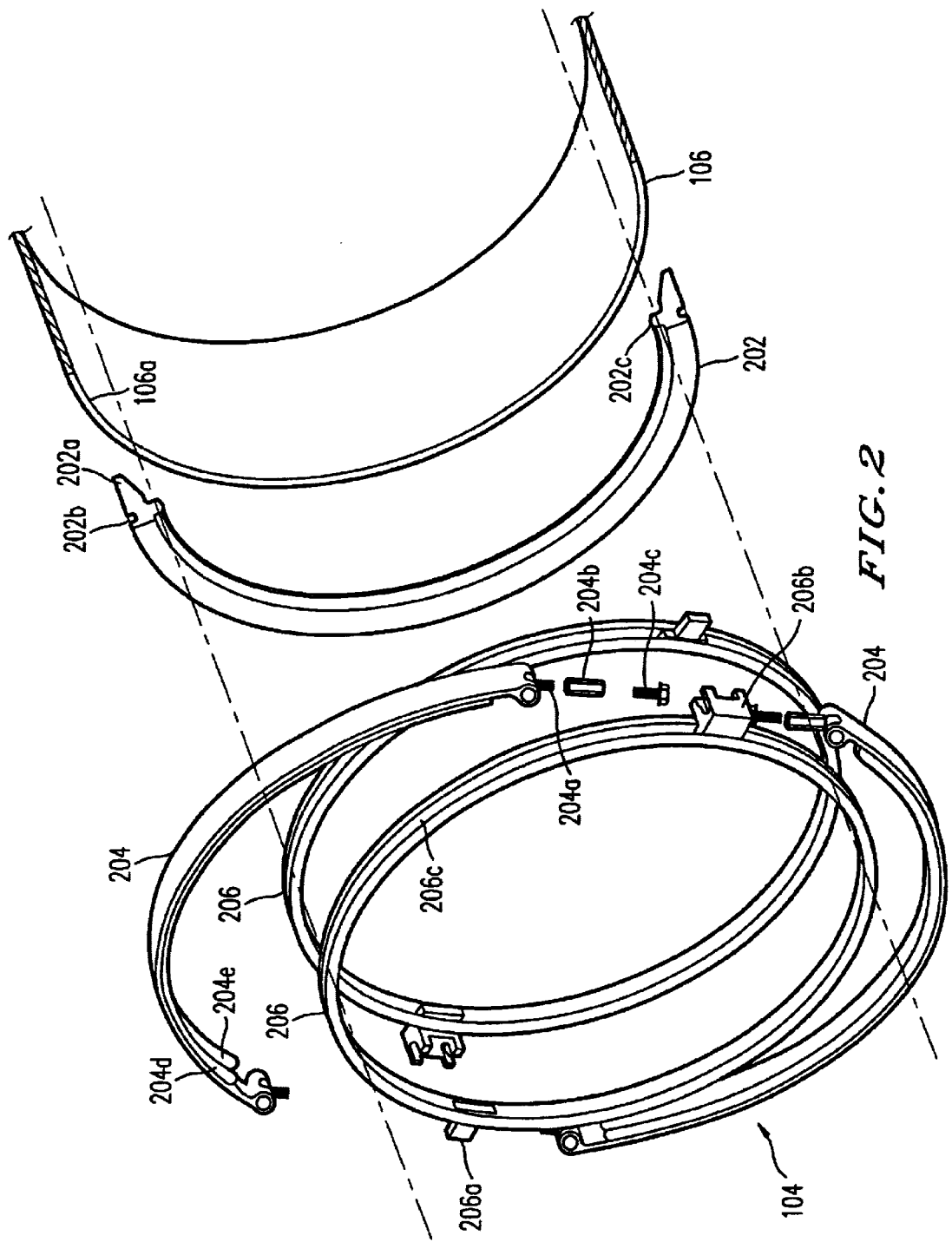
FIG. 2 is a detailed perspective view illustrating a joining ring assembly, a profile section or member, and a vehicle faring (i.e., nose section, mid-body sections, and tail cone sections) of the autonomous underwater vehicle (AUV) of FIG. 1a, according to the present invention.

FIG. 2 is a detailed perspective view illustrating a joining ring assembly 104 including a profile section or member 202, which is semi-cylindrical in shape and which is coupled to a portion of the fairing, for example, mid-body sections 106, of the autonomous underwater vehicle (AUV) of FIG. 1a. The profile section or member 202 of the joining ring assemblies 104 may also be made of ABS plastic and may be attached to a portion of the fairing, for example, mid-body sections 106, via an adhesive bond between portions 202a and 106a. As an alternative, the profile section or member 202 may be integrally formed with a portion of the fairing, or attached to a portion of the fairing in any other manner, such as with screws, bolts, rivets, etc. Although not shown in FIG. 2 for the sake of clarity, both the bottom and the top half of the respective fairing (i.e., mid-body sections 106 and tail cone sections 108) have a profile section or member 202 glued to an end portion thereof. Thus, for example, the joining ring assembly 104, which joins the mid-body sections 106 to the tails cone sections 108, uses four profile sections or members 202.

A compression ring or member 206 is ring-shaped, is included for each vehicle section, and is coupled to the profile section or member 202 at the end of the fairing via a compression ring/member groove 206c that mates with profile section/member ridge 202c of the profile section or member 202. On the side of the compression ring or member 206 are compression ring/member attachment features, fixtures, or members 206a and 206b for attaching to a tension band or member 204 that couples two such compression rings or members 206 via tension band/member attachment components, features, fixtures or members 204a-204c. One joining ring 104 assembly thus uses two compression rings or members 206. The compression rings or members 206 thus re-enforce the fairing at the interface thereof. The tension band or member 204 thus goes around the outside of both profile sections or members 202 from each section or member such that tension band/member ridges 204d and 204e engage with respective profile section/member grooves 202b of the profile sections or members 202. The tension band or member 204 is semi-cylindrical. Thus, one joining ring assembly 104 uses two semi-cylindrical tension bands or members 204 as shown in FIG. 2 (i.e., one on the top and one on the bottom of the sections of the fairing that are being joined).

Figure 3:
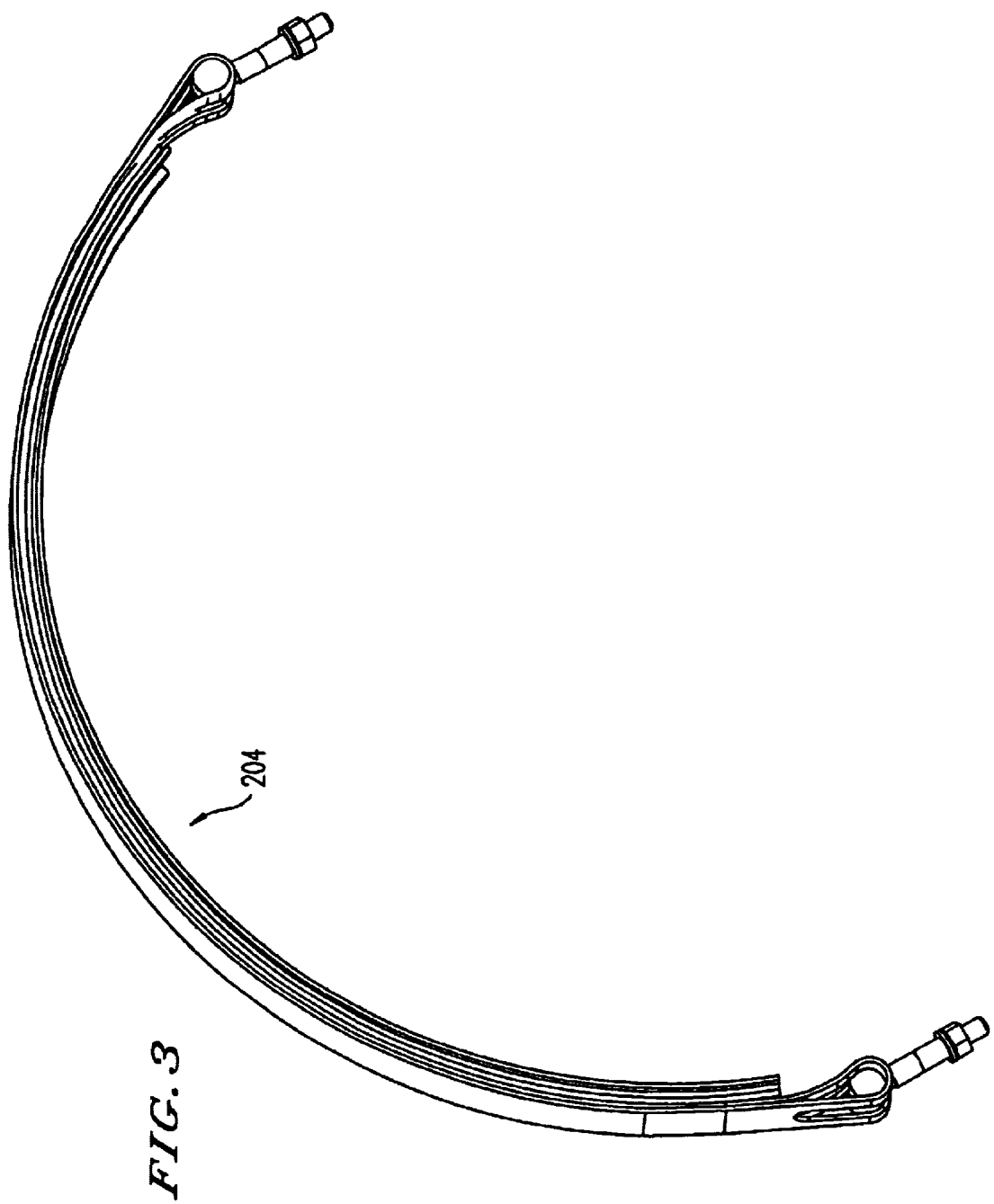
FIG. 3 is a detailed perspective view illustrating a tension band or member of the joining ring assembly of FIG. 2, according to the present invention.
Figure 4:
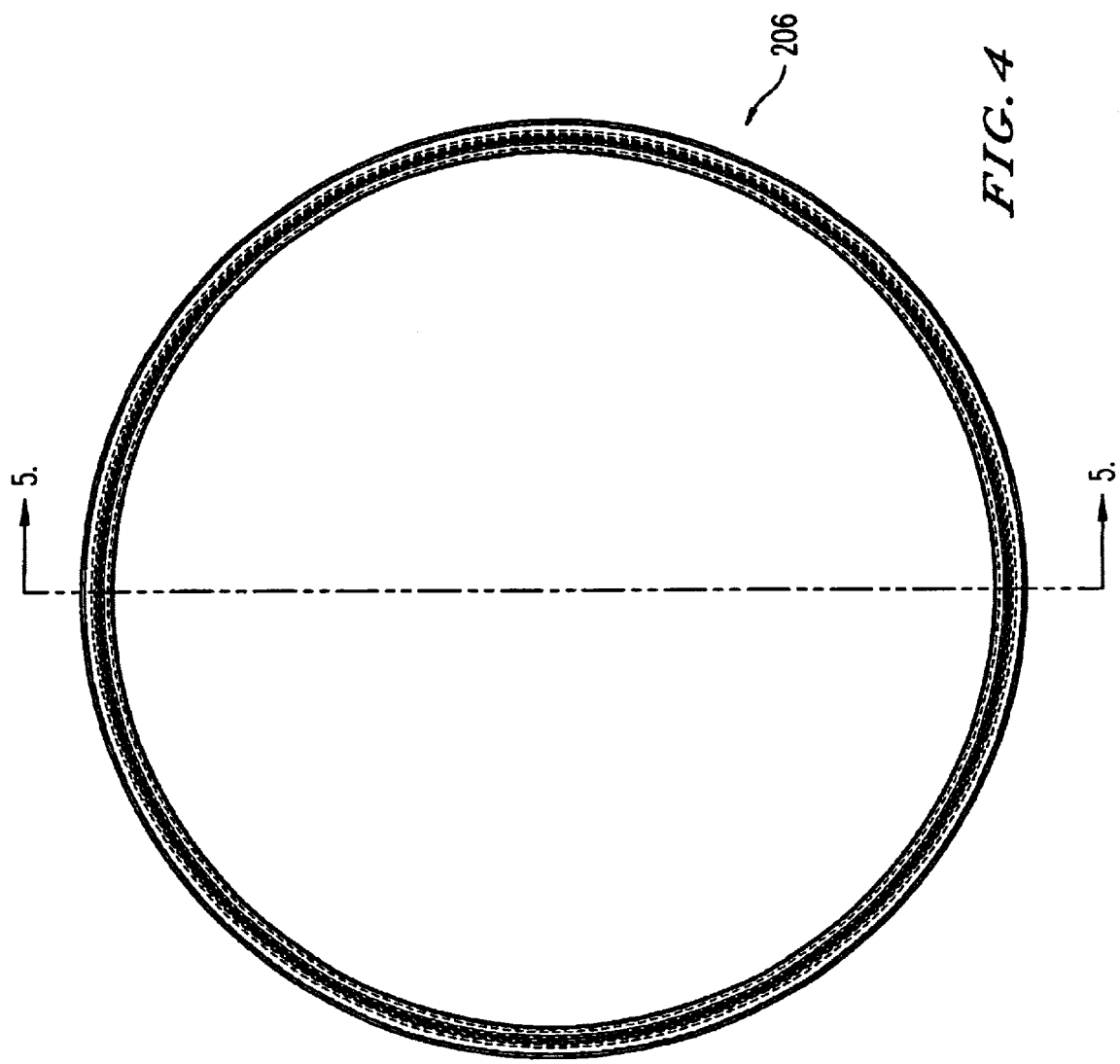
FIG. 4 is a detailed top view illustrating a compression ring or member of the joining ring assembly of FIG. 2, according to the present invention.
Figure 5:
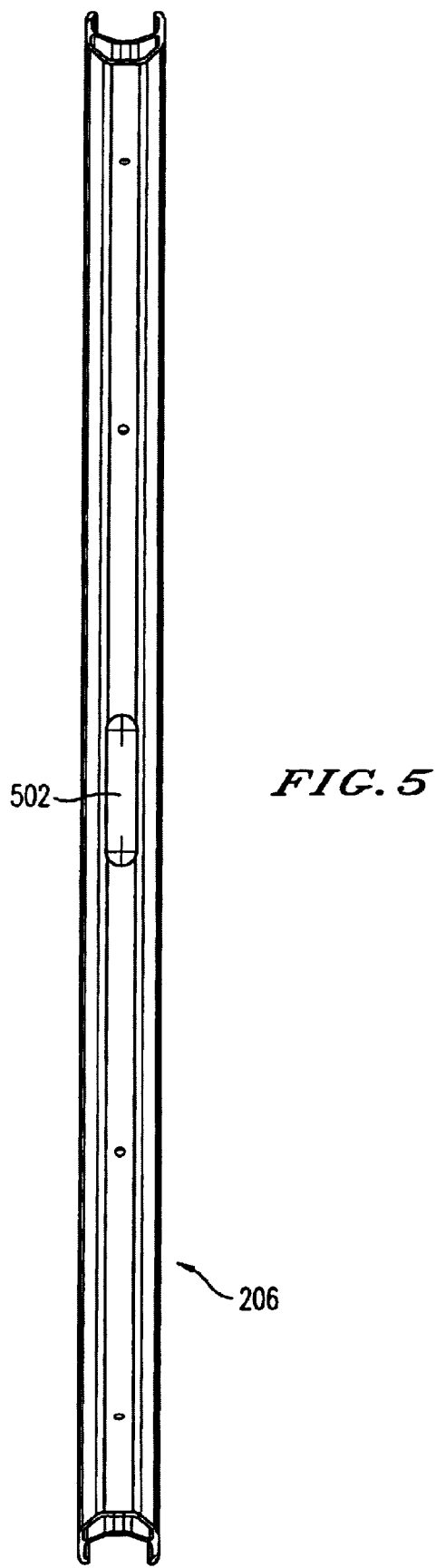
FIG. 5 is a detailed cross-section view of the compression ring or member of FIG. 4, according to the present invention.

FIG. 3 is a detailed perspective view illustrating the tension band or member 204 of the joining ring assembly 104 of FIG. 2. FIG. 4 is a detailed top view illustrating the compression ring or member 206 of the joining ring assembly 104 of FIG. 2. FIG. 5 is a detailed cross-section view taken at line 5—5 of the compression ring or member 206 of FIG. 4 and including compression ring/member hole portions 502 that are used to accommodate the compression ring/member attachment features, fixtures or members 206a and 206b via, for example, a weld joint.

Figure 6:
FIG. 6 is a detailed side view illustrating a compression ring or member of the joining ring assembly of FIG. 2, according to the present invention.
Figure 7A:
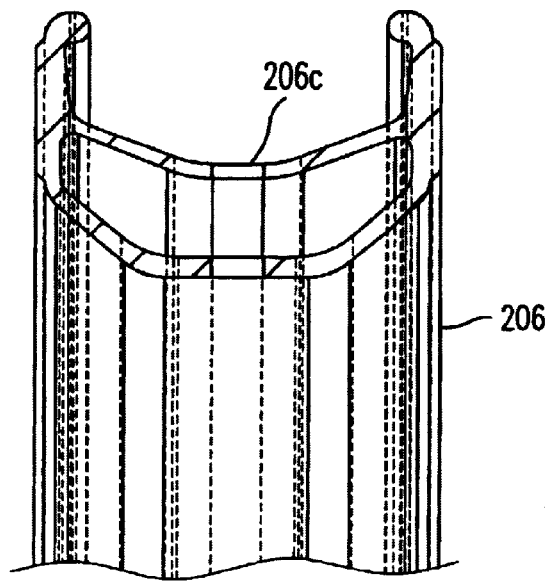
FIGS. 7a and 7b are detailed views illustrating end and hole features of the compression ring or member of FIG. 5, according to the present invention.
Figure 7B:
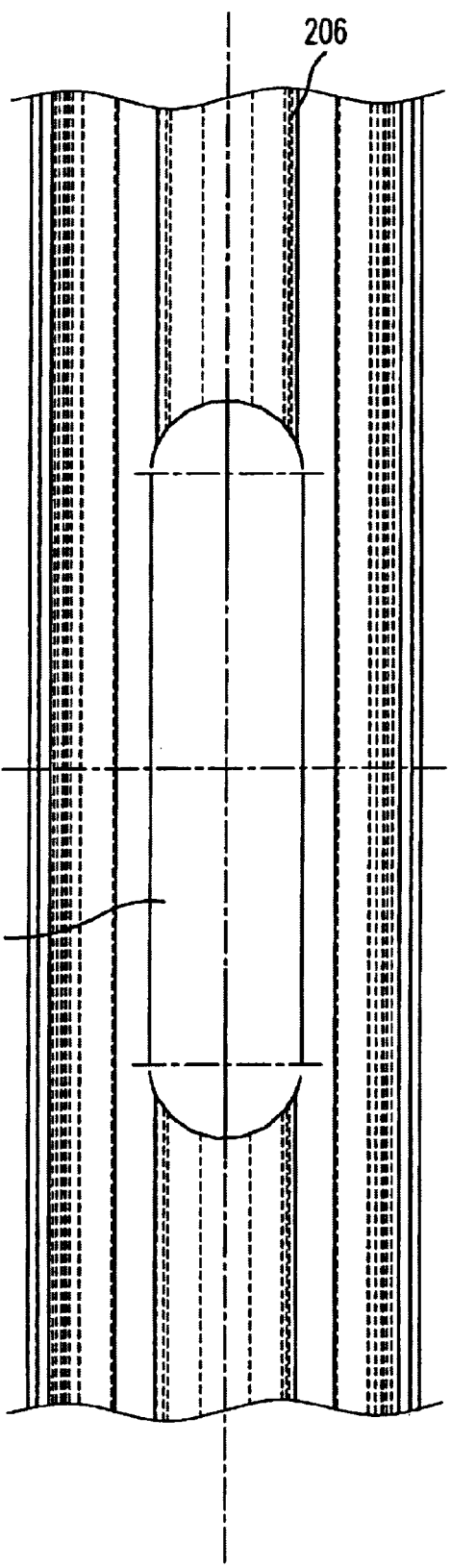
Figure 9:
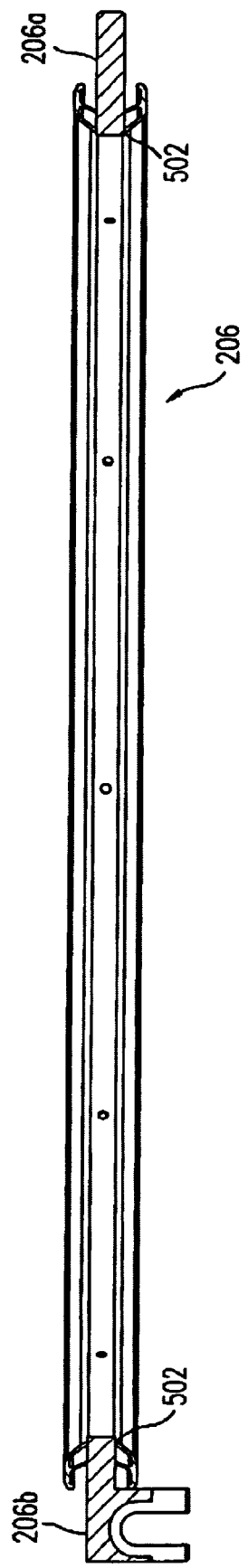
FIG. 9 is a detailed cross-section view of the attachment fixtures or members of the compression ring or member of FIG. 8, according to the present invention.

FIG. 6 is a detailed side view illustrating the compression ring or member 206 of the joining ring assembly 104 of FIG. 2. FIGS. 7a and 7b are detailed views illustrating the compression ring/member groove 206c and compression ring/member hole 502 features of the compression ring or member 206 of FIG. 5. FIG. 8 is a detailed view illustrating compression ring/member attachment features, fixtures or members 206a and 206b attached to respective compression ring/member hole 502 features of the compression ring or member 206 of FIG. 4. FIG. 9 is a detailed cross-section view of the compression ring/member attachment features, fixtures or members 206a and 206b attached to respective compression ring/member hole 502 features taken at line 9—9 of the compression ring or member 206 of FIG. 8.

Figure 10:
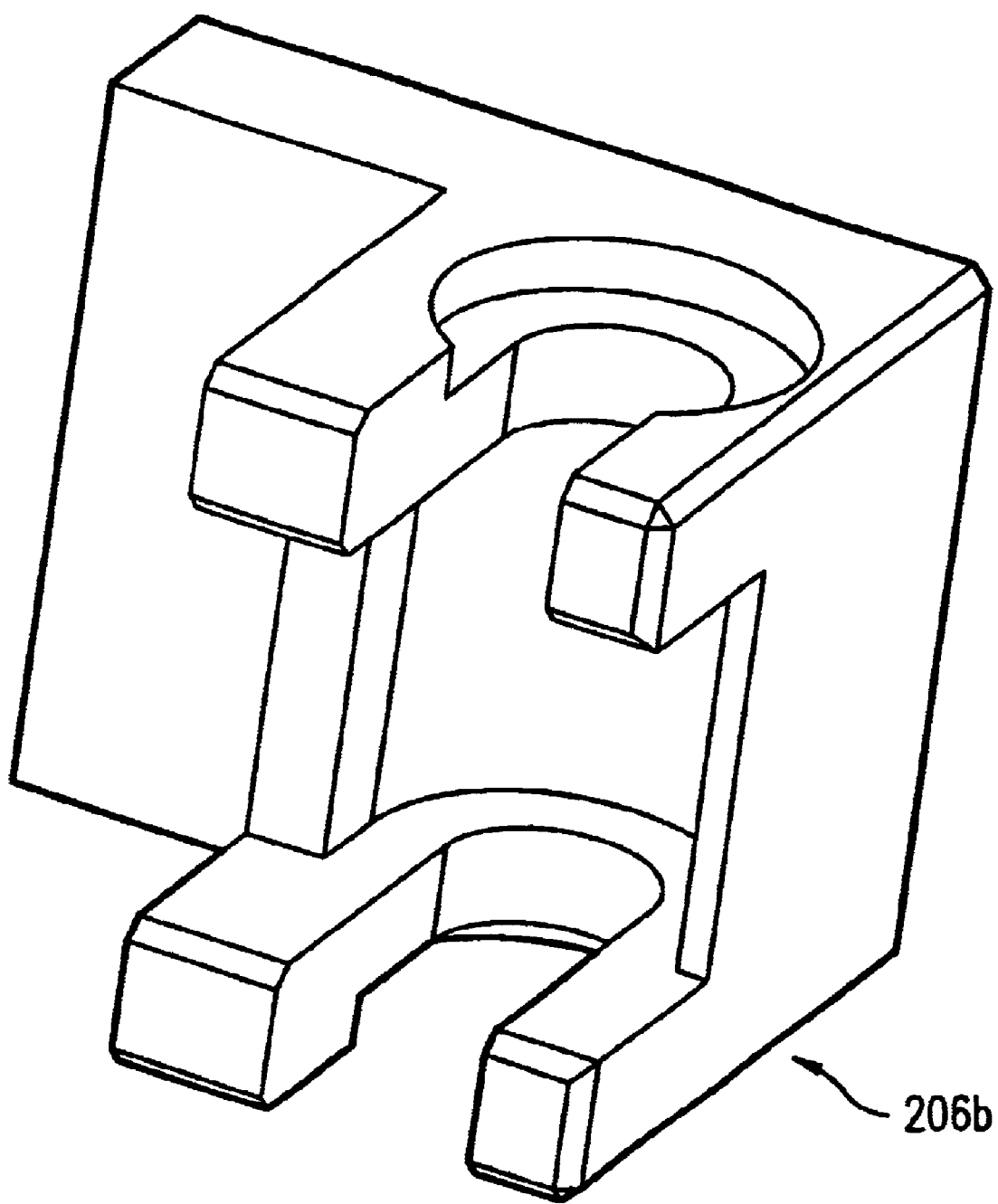
FIG. 10 is a detailed perspective view illustrating an attachment fixture or member of the compression ring or member of FIG. 8, according to the present invention.
Figure 11A:
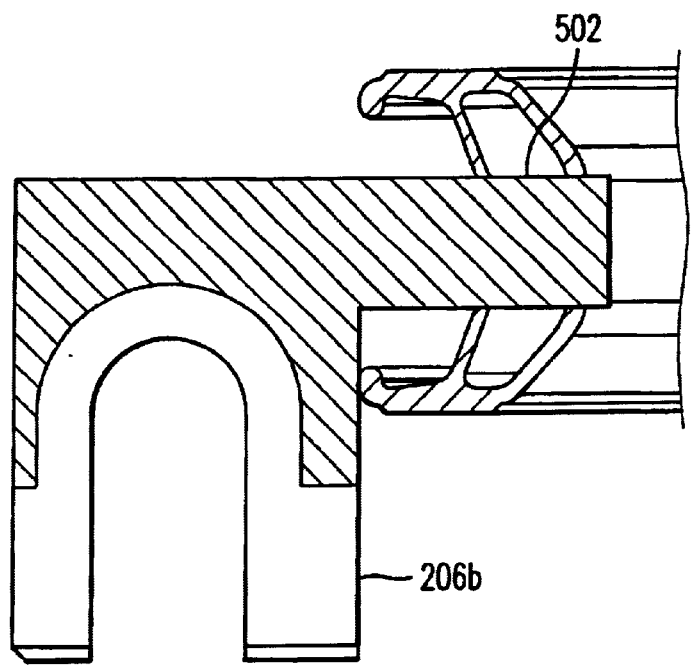
FIGS. 11a and 11b are detailed side views illustrating the attachment fixtures or member of the compression ring or member of FIG. 8, according to the present invention.
Figure 11B:
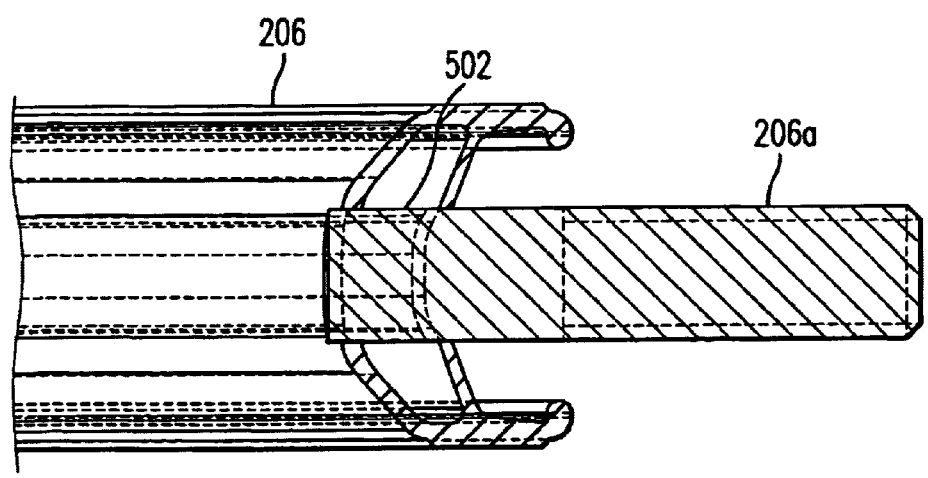

FIG. 10 is a detailed perspective view illustrating the compression ring/member attachment feature, fixture or member 206b of the compression ring or member 206 of FIG. 2. FIGS. 11a and 11b are detailed side views illustrating the compression ring/member attachment features, fixtures or members 206a and 206b attached to respective compression ring/member hole 502 features of the compression ring or member 206 of FIG. 8.

Figure 12:
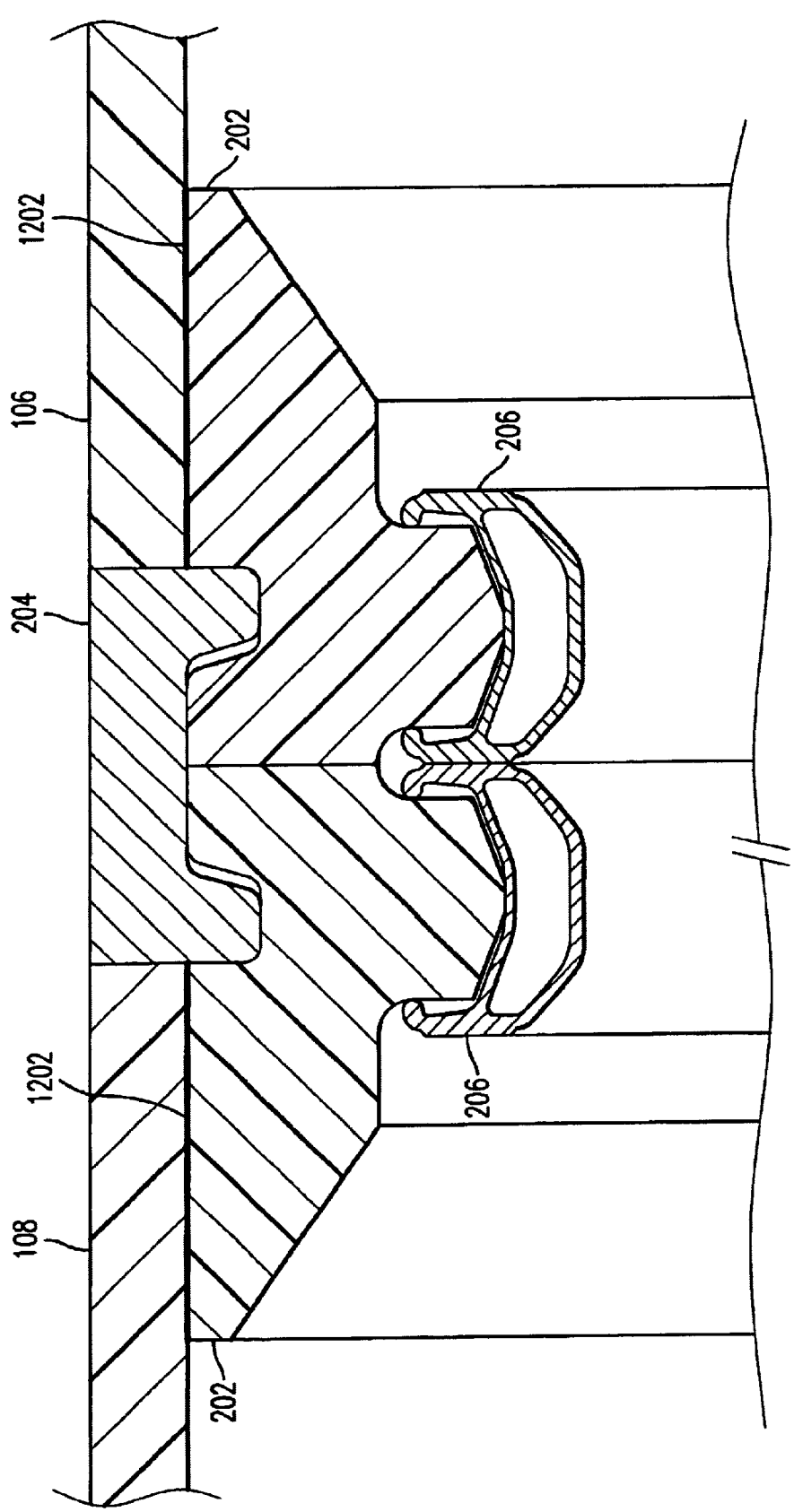
FIG. 12 is a cross-sectional view of the autonomous underwater vehicle (AUV) of FIG. 1a taken at a joining ring assembly, according to the present invention.

FIG. 12 is a cross-section view of the autonomous underwater vehicle (AUV) 100 of FIG. 1a taken at a joining ring assembly 104. In the FIG. 12, the tail cone sections 108 and mid-body sections 106 are coupled to respective profile sections or members 202 via, for example, adhesive 1202. The profile sections or members 202 are coupled to the respective compression rings or members 206 via the tension band or members 204. The top surface of the finished assembly thus provides a smooth vehicle exterior in order to minimize hydrodynamic drag.

Figure 13:
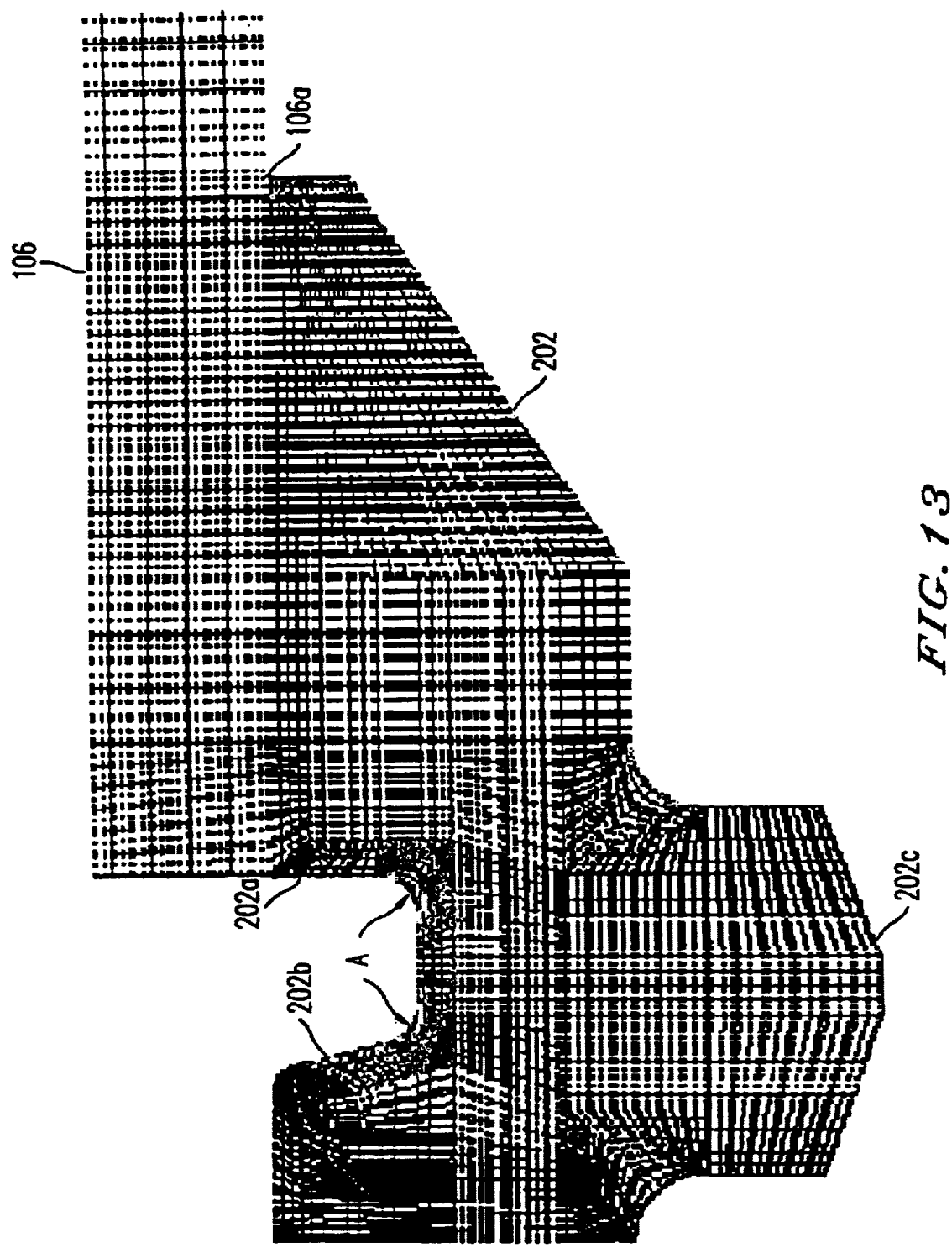
FIG. 13 is a stress diagram taken at a profile section of the AUV of FIG. 1a, according to the present invention.

In the preferred embodiment of the present invention, each compression ring or member 206 can, for example, withstand 600 lbs. of tension. FIG. 13 is a stress diagram taken at a cross-section of the profile section or member 202 of the autonomous underwater vehicle (AUV) 100 of FIG. 1a. In FIG. 13, the tension band or member 204 (not shown) engages to the top of the profile section or member 202 via the tension band/member ridges 204d/204e and the profile section/member grooves 202b of the profile section or member 202. The compression ring/member groove 206c of the compression ring or member 206 (not shown) engages on the bottom of the profile section or member 202 via the profile section/member ridge 202c. The flat top section 202a of the profile section or member 202 is attached to the portion of the fairing (i.e., mid-body section 106) at portion 106a thereof via adhesive (e.g., industrial strength glue, etc.).

The stress analysis of FIG. 13 shows that the highest stress is the rounded corners of the top profile section/member groove 202b, as shown by arrows "A". According to the present invention, even for extreme loads, the maximum equivalent stress is, for example, about half the yield stress for ABS plastic. Thus, the simple fastening apparatus of the present invention provides an even distribution of stress and allows sections to be split both longitudinally and laterally.

Accordingly, autonomous underwater vehicles (AUVs) 100, such as small robotic submarines, provided according to the present invention are robust and easily serviceable. Such autonomous underwater vehicles (AUVs) 100 are complex robots by their nature and therefore periodic maintenance thereof is desirable and easily achieved according to the present invention. In addition, easy access to the inside of the autonomous underwater vehicles (AUVs) 100 is also achieved. Further, autonomous underwater vehicles (AUVs) 100 may be produced according to the present invention in relatively small numbers and with different payloads integrated into the autonomous underwater vehicles (AUVs) 100 for different customers. Accordingly, the autonomous underwater vehicles (AUVs) 100 which is modular according to the present invention has distinct advantages in that it allows different sections to be combined quickly, such as in the case of the swapping of a sensor section, the swapping of a battery section, etc. Moreover, being able to split the autonomous underwater vehicles (AUVs) 100 according to the present invention into different sections greatly facilitates shipping thereof Although the present invention is described in terms of use in autonomous underwater vehicles (AUVs), the present invention may be applied to any application that uses cylindrical sections that are to be joined, as will be appreciated by those skilled in the relevant art(s).

Numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. An apparatus for joining cylindrical sections, comprising:
    a semi-cylindrical profile member adapted to be coupled to one of the cylindrical sections on an outer circumferential portion of said profile member and including an outer circumferential groove and an inner circumferential ridge;
    a ring-shaped compression member coupled to said profile member and including a circumferential groove on an outer portion thereof and a compression member attachment member on each of first and second opposed sides of said compression member; and
    a pair of semi-cylindrical tension members forming a ring shape and each including a pair of inner circumferential ridges and a tension member attachment member on each end portion thereof,
    wherein said inner circumferential ridge of said profile member couples to said circumferential groove of said compression member,
    one of said inner circumferential ridges of one of said tension members couples to said circumferential groove of said profile member, and
    said tension member attachment members of said tension members couple to said compression member attachment members of said compression member.

2. The apparatus of claim 1, wherein said profile member is made of a plastic material.

3. The apparatus of claim 1, wherein said cylindrical section is made of a plastic material.

4. The apparatus of claim 1, wherein said compression member is made of a metallic material.

5. The apparatus of claim 1, wherein said tension members are made of a metallic material.

6. The apparatus of claim 1, wherein said profile member is adapted to be coupled to said cylindrical section via an adhesive material.

7. The apparatus of claim 1, wherein each of said tension members is separately removable via said attachment members of said tension members and said compression member.

8. The apparatus of claim 1, wherein said compression member is adapted to be coupled to another compression member via said attachment members of said compression member and said another compression member.

9. The apparatus of claim 8, wherein said tension members are adapted to be coupled to said compression member and said another compression member via said attachment members of said compression member and said another compression member and said attachment members of said tension members.

10. The apparatus of claim 8, wherein said another compression member is adapted to be coupled to another profile member via said circumferential ridge of said another profile member and said circumferential groove of said another compression member.

11. The apparatus of claim 8, wherein said another profile member is adapted to be coupled to another cylindrical section on an outer circumferential portion of said another profile member.

12. The apparatus of claim 10, wherein said tension members are adapted to be coupled to said profile member and said another profile member via said pair of inner circumferential ridges of said tension members and said outer circumferential groove of said profile member and said another profile member.

* * * * *